United States Patent [19]

Urban

[11] 4,004,340

[45] Jan. 25, 1977

[54] PROCESS OF CUTTING DEVELOPED FILM STRIPS INTO FILM SECTIONS AND OF IMMEDIATELY SUBSEQUENTLY INTRODUCING SAID FILM SECTIONS INTO SLIDE FRAMES

[75] Inventor: Otfried Urban, Garmisch-Partenkirchen, Germany

[73] Assignee: Geimuplast Peter Mundt KG, Garmisch, Germany

[22] Filed: Dec. 18, 1974

[21] Appl. No.: 534,132

Related U.S. Application Data

[63] Continuation-in-part of Ser. No. 263,202, June 15, 1972, abandoned.

[30] Foreign Application Priority Data

June 25, 1971 Germany ........................ 2131611
Oct. 28, 1971 Germany ........................ 2153874

[52] U.S. Cl. .................................. 29/417; 29/411; 53/23; 53/123

[51] Int. Cl.² ........................................ B23P 17/04

[58] Field of Search ................ 29/200 R, 411, 412, 29/417; 53/23, 123, 28, 180; 156/108, 250, 253, 256, 513, 514, 517, 521, 556, 563, 570, 223, 227, 443

[56] References Cited

UNITED STATES PATENTS

| | | | |
|---|---|---|---|
| 2,725,155 | 11/1955 | Fitch et al. | 156/355 |
| 3,067,805 | 12/1962 | Flynn | 156/443 |
| 3,524,299 | 8/1970 | Mundt et al. | 53/23 |

FOREIGN PATENTS OR APPLICATIONS

| | | | |
|---|---|---|---|
| 1,918,970 | 10/1970 | Germany | 53/123 |
| 2,162,792 | 6/1973 | Germany | 53/123 |
| 2,162,793 | 6/1973 | Germany | 53/123 |

*Primary Examiner*—Victor A. DiPalma
*Attorney, Agent, or Firm*—Fleit & Jacobson

[57] ABSTRACT

The slide frames consist of plastic material and are supplied ready for use. The film is fed in steps to a cutting device for severing the leading film section. The film section severed by the cutting device is gripped in the cutting station by a plierlike gripping device and in this position, without being pivotally moved through 180°, is inserted as far as possible for projection into the internal space of a frame, which is held ready in an expanded or unfolded position. The film section is held in this position for projection until the expanded or unfolded frame part is released. Two protective strips of transparent material, such as polycarbonate, are fed on respective sides of the film strip before the cutting device. The protective strips have for each feeding step at least one perforation hole, which is aligned with a perforation hole of the film strip. The two protective strips sandwiching the film strip are subjected to the same process steps as the film strip in unison therewith.

11 Claims, 2 Drawing Figures

PROCESS OF CUTTING DEVELOPED FILM STRIPS INTO FILM SECTIONS AND OF IMMEDIATELY SUBSEQUENTLY INTRODUCING SAID FILM SECTIONS INTO SLIDE FRAMES

RELATED APPLICATION

This is a continuation-in-part of U.S. Pat. Application Ser. No. 263,202, filed on June 15, 1972, and now abandoned.

This invention relates to a process of cutting developed film strips into film sections and of immediately subsequently introducing said sections into slide frames made of plastic material and supplied ready for use. In the process the film is fed in steps to a cutting device for severing the leading film section, the film section severed by the cutting device is gripped in the cutting station by a plierlike gripping device and in this position, without being pivotally moved through 180°, is inserted as far as possible for projection into the internal space of a frame, which is held ready in an expanded or unfolded position, and the film section is held in position for projection until the expanded or unfolded frame part is released. Such process is known from the German Patent specification 1,285,765.

If frames which incorporate cover glasses in both frame halves are used in such process, these cover glasses must be held by overlapping elements, such as hooks or thermally deformed pins. This has the disadvantage that the space between the two cover glasses exceeds the thickness of the transparency so that the transparency in such frame can move in the direction of projection and the projected picture is blurred.

Whereas dust-tight cassettes and blower-cooled projectors are available, there are cases in which it is believed that the transparency should be disposed between two cover glasses so that the delicate surface of the transparency, which in most cases is unique, is protected from external influences during projection and storage. This applies to record pictures or to series of transparencies for educational use. In such cases, it is still usual to place the transparencies between two glass plates or in plastic frames having cover glasses, by expensive manual work. An economic process for an automatic mounting so as to preclude the above-described disadvantage has not yet been provided. Before the process previously mentioned, processes have been disclosed in which the lower part of the frame, a film section, and an upper part of the frame are separately fed to an automatic mounting machine and in said machine are combined to form a transparency ready for use. The latter processes are so expensive that there have been no serious attempts to increase the complication of such automatic framing machines so as to additionally feed two cover glasses.

It is an object of the invention to develop the process first previously described so that fully protected transparencies ready for projection can be produced in large quantities at a high rate.

In a process of the kind previously defined this object is accomplished by the invention in that two protective strips of transparent material, such as polycarbonate, are fed on respective sides of the film strip before the cutting device. The protective strips have for each feeding step at least one perforation hole, which is aligned with a perforation hole of the film strip, and the two protective strips sandwiching the film strip are subjected to the same process steps as the film strip in unison therewith. In addition to accomplishing the object set forth, the process according to the invention affords the advantage that low-cost, glassless service frames which are available on the market may be used.

In a preferred embodiment of the invention, the material thickness of at least one protective strip is selected so that a support for the film strip is provided and an exactly planar position in the projection plane is attained. Thus, the invention combines all advantages of a frame having cover glasses with the above-mentioned advantages of the cost reduction resulting from a fast automatic mounting. Another advantage compared to glass frames resides in a considerable saving of weight.

The protective strip may be roughened on its surface facing the film strip to prevent a formation of Newton's rings.

For special applications, it is a feature of the invention that at least one of the protective strips is provided with information and/or colored areas. In this case, information other than that on the film is projected such as registration data, e.g., numbers, dates, and subject fields, or so-called titles or advertising copy. One or both of the protective strips may be colored for color correction and special color intensification effects.

The continuous and synchronous feeding of the film strip and of the two protective strips into the mounting machine affords the further advantage that the often inconvenient attraction of dust resulting in the presence of dust particles between the film and the cover layers is avoided. The three strips may be treated with dust brushes before they are fed together, if desired. Commercially available brushes, which in most cases are tipped with plutonium, may be used for this purpose. Because there is no subsequent relative movement between the film and the protective layers, a renewed charging and renewed attraction of dust in the interior of the stack consisting of the film strip and the two protective strips is prevented.

The invention will be described hereinafter by way of example with reference to the drawing, in which an apparatus for carrying out the process according to the invention is diagrammatically shown.

Figure 1:
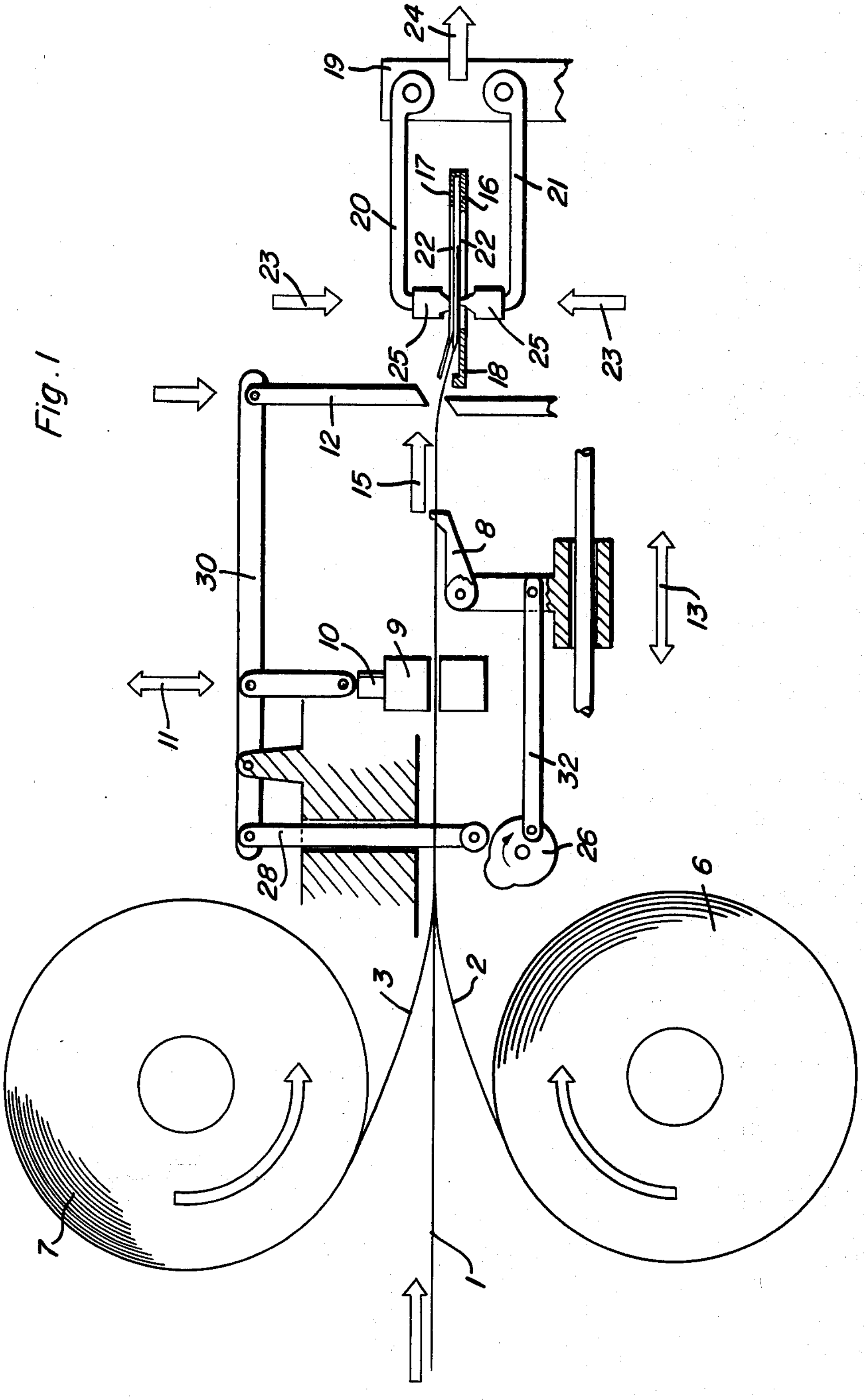
FIG. 1 is an overall view showing such apparatus.

The film strip 1 and the two protective strips 2, 3 have the same width. The protective strips 2, 3 have in one marginal portion one perforation hole 4 for each feeding step. These perforation holes register with respective perforation holes 5 in the film strip 1. This is apparent from FIG. 2 at 4'', 5, and 4''', 5'. It will be understood that the protective strips may be provided in both marginal portions with perforation holes which are identical to and aligned with respective perforation holes in the film strip 1.

The protective strips 2, 3 are fed from supply rolls 6, 7 and are converged in such a manner that one protective strip 3 is disposed over the film strip 1 and one protective strip 2 is disposed below the film strip 1. The perforation hole pattern required for feeding the strips will depend on the feeding mechanism of the mounting machine. Where a single-tooth claw 8 is used, such as is diagrammatically indicated in the drawings, one perforation hole 4 in each protective strip is sufficient for each feeding step. The perforation holes may be punched during the manufacture of the sheeting or, as in the embodiment shown by way of example, in step with the mounting machine.

Figure 2:
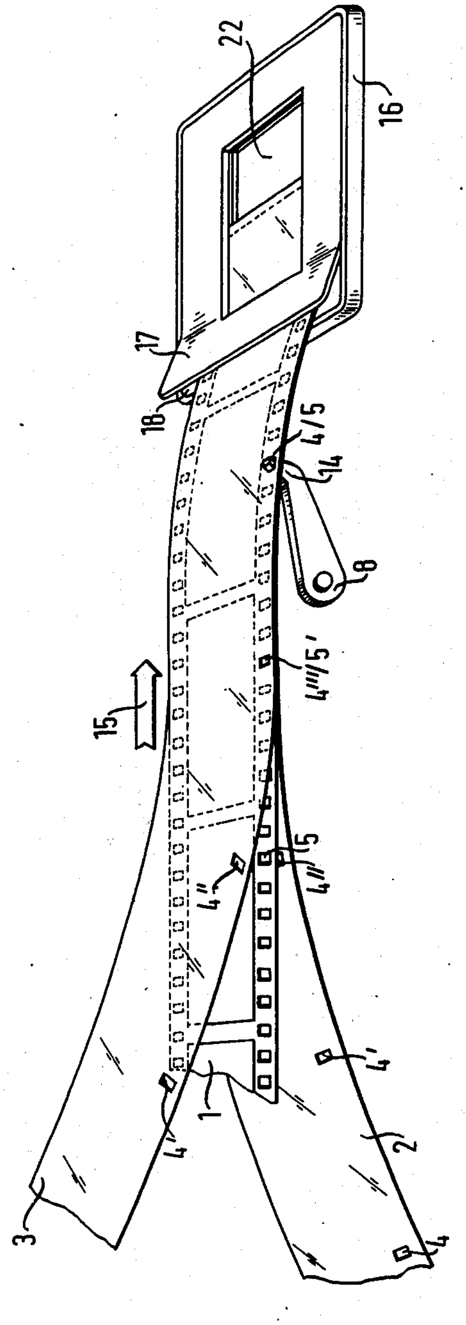
FIG. 2 is an enlarged perspective view showing a portion of FIG. 1.

The single-tooth claw 8 reciprocates in a horizontal direction, as is indicated in FIG. 1 by the arrow 13. As the pointed tip 14 of the single-tooth claw 8 enters the aligned perforation holes 4, 5 of the protective strips and the film strip 1, the latter and the protective strips 2, 3 are moved in synchronism in the direction of the arrow 15 into a frame 16, which has been expanded to receive the strips. The cover part 17 of the frame 16 is expanded by means known per se so that a receiving slot 18 is formed. The film strip 1 and the protective strips 2, 3 are inserted into the frame 16 to such an extent that they can be gripped by the gripping tool 19 shown in FIG. 1. The two arms 20, 21 of said tool move through the picture opening 22 (FIG. 2). The two gripper arms 20, 21 press against each other in the direction of the arrows 23 so that the stack is held firmly together and in this condition is cut off by the knife of the cutting device 12. As can be seen in FIG. 2, the punching device 9 and the cutting device 12 are synchronously operated by a rotating caming drive mechanism 26 acting on the punch 10 and the knife of the cutting device 12 through linking arms 28 and 30. The same drive mechanism 26 controls the reciprocating movement of the claw 8 through linking arm 32.

The severed stack section is now drawn into the frame 16 by the same gripping device 19 in the direction of the arrow 24. This action occurs at a point in time after the stack section is punched by punching device 9 and severed by cutting device 12, and can be accomplished through any conventional mechanism for developing rectilinear motion.

To avoid damage to or a marking of the protective strips and to increase the friction, the ends of the gripper arms 20, 21 are provided with a soft elastic covering 25.

Alternatively, the process according to the invention may be carried out in an apparatus such as is known from the Printed German Application 1,918,970. In that modified embodiment of the invention, two protective strips of transparent material are also fed on respective sides of the film strip before the cutting device, these protective strips have been provided during their manufacture with perforation holes, which register with those in the film strip, and the two protective strips sandwiching the film strip are subjected together with the film strip to the same process steps which have been described in the Printed German Application 1,918,970.

I claim:

1. A process of cutting developed film strips into film sections and of immediately subsequently introducing said sections into slide frames made of plastic material supplied ready for use, comprising feeding two protective strips of transparent material on respective sides of a film strip in a series of intermittent feeding steps, said protective strips having for each feeding step at least one perforation hole which is aligned with a perforation hole of the film strip, the two protective strips sandwiching the film strip to form a sandwiched film strip, advancing said film strip in said feeding steps to a cutting device; severing the leading film section with said cutting device, gripping the film section severed by the cutting device with a plierlike gripping device and in this position, without being pivotally moved through 180°, inserting the severed section as far as to the position for projection into the internal space of an expanded frame, and releasing the expanded frame to return to its original shape to hold the film section in position for projection.

2. A process according to claim 1, characterized in that the material thickness of at least one protective strip is selected so that a support for the severed film section is provided.

3. A process according to claim 1, characterized in that the protective strips are fed from supply rolls above and below the film strip.

4. A process according to claim 1, characterized in that the perforation holes in the protective strips are punched by a device which precedes the feeding mechanism of a mounting machine and operates in step with the feeding mechanism.

5. A process according to claim 1, characterized in that each protective strip is roughened on its surface facing the film strip.

6. A process according to claim 1, including treating the three strips with dust brushes before being combined.

7. A process according to claim 1, including providing at least one of the protective layers with information.

8. A process according to claim 1, wherein the slide frame consists of a lower part having a continuous peripheral rim, and a cover part, with the film section being fed in a plane disposed above the plane in which the frame is held ready, said film section being deflected into the plane in which the frame is held ready, and moved by the gripping device over the rim of the lower part of the frame into its position for projection.

9. A process according to claim 1, wherein the leading end of the stack consisting of the film strip and the two protective strips is first partly inserted into the frame and is subsequently gripped by the arms of the plierlike gripping device after which the leading stack section is severed from the stack strip by the cutting device.

10. A process according to claim 1 including the step of providing at least one of said protective strips with colored areas.

11. A process of cutting developed film strips into film sections and of immediately subsequently introducing said sections into slide frames made of plastic material supplied ready for use, comprising feeding two protective strips of transparent material, on respective sides of a film strip in a series of intermittent feeding steps, said protective strips having for each feeding step at least one perforation hole which is aligned with a perforation hole of the film strip, two protective strips sandwiching the film strip, advancing said sandwiched film strip in said feeding steps to a cutting device; severing the leading film section with said cutting device, gripping the film section severed by the cutting device with a plierlike gripping device and in this position, without being pivotally moved through 180°, inserting the severed section as far as to the position for projection into the internal space of an expanded frame, and releasing the expanded frame to return to its original shape to hold the film section in position for projection.

* * * * *